United States Patent
Kim et al.

(10) Patent No.: US 8,568,624 B2
(45) Date of Patent: Oct. 29, 2013

(54) ACRYLIC RESIN COMPOSITION, AND OPTICAL FILM COMPRISING SAME

(75) Inventors: Su-Kyung Kim, Daejeon (KR); Byoung-Il Kang, Daejeon (KR); Dae-Woo Lee, Busan (KR); Byoung-Kue Chun, Daejeon (KR); Chang-Hun Han, Daejeon (KR); Da-Eun Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 21 days.

(21) Appl. No.: 13/202,068

(22) PCT Filed: Feb. 18, 2010

(86) PCT No.: PCT/KR2010/001019
§ 371 (c)(1),
(2), (4) Date: Aug. 17, 2011

(87) PCT Pub. No.: WO2010/095870
PCT Pub. Date: Aug. 26, 2010

(65) Prior Publication Data
US 2011/0297896 A1 Dec. 8, 2011

(30) Foreign Application Priority Data
Feb. 18, 2009 (KR) .................. 10-2009-0013271

(51) Int. Cl.
*F21V 9/14* (2006.01)
*G02B 5/30* (2006.01)
*G02C 7/12* (2006.01)
*G02B 5/23* (2006.01)
*C08L 35/00* (2006.01)
*C08L 39/04* (2006.01)

(52) U.S. Cl.
USPC ............ 252/585; 252/586; 264/1.6; 264/165; 525/55; 525/148; 525/185; 525/205; 525/216; 525/227; 525/228; 526/262; 526/293; 526/309; 526/326; 526/329.2

(58) Field of Classification Search
USPC ........... 252/585, 586; 359/485; 524/548, 543; 525/55, 73, 77, 78, 79, 85, 148, 185; 525/205, 216, 227, 228; 526/262, 293, 309, 526/326, 329.2; 264/1.6, 165
See application file for complete search history.

(56) References Cited

U.S. PATENT DOCUMENTS 7,348,382 B2 * 3/2008 Ueno et al. ............. 526/87

FOREIGN PATENT DOCUMENTS

| JP | 02-142809 | | 5/1990 |
|---|---|---|---|
| JP | 06-001903 | | 1/1994 |
| JP | 07-281002 | * | 10/1995 |
| JP | 2004-018710 | | 1/2004 |
| JP | 2008-146003 | * | 6/2008 |
| JP | 2008-189886 | | 8/2008 |
| JP | 2008-268720 | | 11/2008 |
| JP | 2008-299096 | * | 12/2008 |
| KR | 10-2008-0050398 | | 6/2008 |
| WO | WO 2007/026659 | | 3/2007 |

* cited by examiner

*Primary Examiner* — Bijan Ahvazi
(74) *Attorney, Agent, or Firm* — McKenna Long & Aldridge, LLP

(57) ABSTRACT

The present invention relates to an acrylic copolymer resin containing: 1) an alklyl (meth)acrylate-based monomer; 2) a (meth)acrylate-based monomer containing an aliphatic ring and/or an aromatic ring; and 3) at least an imide-based monomer or a styrene-based monomer, to a resin composition containing said acrylic copolymer resin and a resin containing an aromatic ring and/or an aliphatic ring in the main chain thereof, to an optical film comprising said resin composition, and to a liquid crystal display device comprising said optical film. The optical film according to the present invention has excellent heat resistance, optical transparency, etc.

23 Claims, 2 Drawing Sheets

Figure 3

| PROTECTIVE FILM |
| POLARIZER |
| PROTECTIVE FILM |

| OPTICAL FILM OF THE PRESENT INVENTION |

| LIQUID CRYSTAL CELL |

| PROTECTIVE FILM |
| POLARIZER |
| PROTECTIVE FILM |

Figure 4

| PROTECTIVE FILM |
| POLARIZER |
| PROTECTIVE FILM |

| OPTICAL FILM OF THE PRESENT INVENTION |

| LIQUID CRYSTAL CELL |

| OPTICAL FILM OF THE PRESENT INVENTION |

| PROTECTIVE FILM |
| POLARIZER |
| PROTECTIVE FILM |

ACRYLIC RESIN COMPOSITION, AND OPTICAL FILM COMPRISING SAME

This application is a National Stage Entry of International Application No. PCT/KR2010/001019, filed Feb. 18, 2010, and claims priority to and the benefit of Korean Patent Application No. 10-2009-0013271, filed on Feb. 18, 2009, which is hereby incorporated by reference in its entirety for all purposes as if fully set forth herein.

TECHNICAL FIELD

The present invention relates to an acrylic copolymer resin which has excellent heat resistance, to a resin composition including the acrylic copolymer resin, to an optical film which includes the resin composition and has excellent heat resistance and optical transparency, and to a liquid crystal display device including the optical film.

BACKGROUND ART

Recently, display technologies using various methods such as a plasma display panel (PDP), a liquid crystal display (LCD) and the like that are used instead of a known brown tube in accordance with the development of optical technologies are suggested and sold. The higher properties of the polymer material for displays are required. For example, in the case of the liquid crystal display, according to the development toward the thin film, the lightness, and enlargement of the screen area, the wide viewing angle, the high contrast, the suppression of change in image color tone according to the viewing angle and the uniformity of the screen display are particularly considered as important problems.

Therefore, various polymer films such as a polarizing film, a retardation film, a plastic substrate, a light guide plate and the like are used, and various modes of liquid crystal displays such as twisted nematic (TN), super twisted nematic (STN), vertical alignment (VA), in-plane switching (IPS) liquid crystal cells are developed. Since all of these liquid crystal cells have intrinsic liquid crystal alignment, they have intrinsic optical anisotropic property, and in order to compensate the optical anisotropic property, a film in which a retardation function is provided by stretching various kinds of polymers has been suggested.

In detail, since a liquid crystal display device uses high birefringence property and alignment of liquid crystal molecules, the birefringences are different according to the viewing angle and thus the color and brightness of the picture are changed. For example, since most liquid crystal molecules that are used in a vertical alignment method have a positive retardation in a liquid crystal display surface, in order to compensate this, a compensation film that has a negative retardation is required. In addition, light does not pass through the front sides of two polarizing plates that are perpendicular to each other, but if the angle is inclined, the light axes of two polarizing plates are not perpendicular to each other, thus light leakage occurs. In order to compensate this, a compensation film having the in-plane retardation is required. In addition, display devices using a liquid crystal require both thickness retardation compensation and in-plane retardation compensation in order to widen the viewing angle.

Requirements of the retardation compensation film are to control the birefringence easily. However, the film birefringence is formed by a basic birefringence which belongs to the material and the orientation of polymer chains in the film. The orientation of the polymer chains is mostly forcibly performed by force applied from the outside or is caused by the intrinsic properties of the material, and the orientation method of the molecules by the external force is to stretch a polymer film uniaxially or biaxially.

In order to solve viewing angle problems of LCDs due to intrinsic birefringence properties of the liquid crystal, N-TAC, V-TAC, and COP Films have been recently used as a compensation film or a retardation film. However, these films are expensive and have problems in that processes are complicated during the manufacture of the films.

DISCLOSURE

Technical Problem

An aspect of the present invention provides an acrylic copolymer resin which maintains transparency and has better heat resistance than the related-art.

Another aspect of the present invention provides a resin composition containing the acrylic copolymer resin and a resin containing an aromatic ring and/or an aliphatic ring in the main chain thereof.

Another aspect of the present invention provides an optical film which has excellent heat resistance and optical transparency and contains the resin composition and a liquid crystal display device containing the optical film.

Technical Solution

According to an aspect of the present invention, there is provided an acrylic copolymer resin containing 1) an alkyl (meth)acrylate-based monomer, 2) a (meth)acrylate-based monomer containing an aliphatic ring and/or an aromatic ring, and 3) at least one of an imide-based monomer and a styrene-based monomer.

According to another aspect of the present invention, there is provided a resin composition containing the acrylic copolymer resin and a resin containing an aromatic ring and/or an aliphatic ring in the main chain thereof.

According to another aspect of the present invention, there is provided an optical film including the resin composition.

According to another aspect of the present invention, there is provided a liquid crystal display device including the optical film.

Advantageous Effects

An acrylic copolymer resin according to the present invention has excellent heat resistance while maintaining transparency. An optical film manufactured by using a resin composition including the acrylic copolymer resin has excellent transparency and heat resistance and is excellent in processability, adhesion, retardation property, and durability.

DESCRIPTION OF DRAWINGS

The above and other aspects, features and other advantages of the present invention will be more clearly understood from the following detailed description taken in conjunction with the accompanying drawings, in which:

FIGS. 1 to 4 illustrate examples of applying an optical film according to an embodiment of the present invention to a liquid crystal display device.

BEST MODE

Figure 1:
Figure 1:

Exemplary embodiments of the present invention will now be described in detail with reference to the accompanying drawings.

Hereinafter, the present invention will be described in more detail.

According to an aspect of the present invention, there is provided an acrylic copolymer resin containing 1) an alkyl (meth)acrylate-based monomer; 2) a (meth)acrylate-based monomer containing an aliphatic ring and/or an aromatic ring; and 3) at least one of an imide-based monomer and a styrene-based monomer.

A copolymer resin including a monomer used herein means that a monomer is polymerized and included as a repeating unit in the copolymer resin.

The acrylic copolymer may be a block copolymer or a random copolymer, but it is not limited thereto.

The acrylic copolymer may be a three-membered copolymer containing an alkyl (meth)acrylate-based monomer; a (meth)acrylate-based monomer containing an aliphatic ring and/or an aromatic ring; and a styrene-based monomer; a four-membered copolymer additionally containing an imide-based monomer thereto; and a three-membered monomer containing an alkyl (meth)acrylate-based monomer; a (meth) acrylated-based monomer containing an aliphatic ring and/or an aromatic ring; and an imide-based monomer.

In the acrylic copolymer resin, the alkyl (meth)acrylate-based monomer and the (meth)acrylate-based monomer are preferably present in an amount of 30 wt % to 90 wt % and more than 0 wt % and 50 wt % or less, respectively. In addition, the imide-based monomer and the styrene-based monomer are preferably present in an amount of 0.1 wt % to 50 wt % and 0.1 wt % to 50 wt %, respectively, and these may be included in the acrylic copolymer alone or in combination.

In the acrylic copolymer resin, the alkyl(meth)acrylate-based monomer means both an alkylacrylate-based monomer and an alkyl methacrylate-based monomer. The alkyl group in the alkyl(meth)acrylate-based monomer has preferably a carbon number of 1 to 10 and more preferably 1 to 4, and may be a methyl group or an ethyl group. The alkyl methacrylate-based monomer may be more preferably methylmethacrylate, but it is not limited thereto.

In the acrylic copolymer resin, the alkyl methacrylate-based monomer is present preferably in an amount of 30 wt % to 90 wt % and more preferably 50 wt % to 90 wt %. When the alkyl methacrylate-based monomer is present in the range, heat resistance may be maintained while its transparency is excellent.

The (meth)acrylate-based monomer containing an aliphatic ring and/or an aromatic ring in the acrylic copolymer resin serves to increase the heat resistance of the acrylic copolymer resin according to the present invention, and may be, for example, a cycloalkyl (meth)acrylate-based monomer or an aryl (meth)acrylate-based monomer.

A cycloalkyl group of the cycloalkyl (meth)acrylate-based monomer has preferably a carbon number of 4 to 12, more preferably 5 to 8, and most preferably a cyclohexyl group. In addition, an aryl group of the aryl(meth)acrylate-based monomer has preferably a carbon number of 6 to 12, and most preferably is a phenyl group.

Specific examples of the (meth)acrylate-based monomer containing an aliphatic ring and/or an aromatic ring are preferably cyclopentyl methacrylate, cyclohexyl methacrylate, benzyl methacrylate, cyclohexyl acrylate, 2-phenoxyethyl acrylate, 3,3,5-trimethylcyclohexyl methacrylate, 4-t-butyl-cyclohexyl methacrylate, 3-cyclohexylpropyl methacrylate, phenyl methacrylate, 4-t-butylphenyl methacrylate, 4-methoxyphenyl methacrylate, 1-phenylethyl methacrylate, 2-phenylethyl acrylate, 2-phenylethyl methacrylate, 2-phenoxyethyl methacrylate, 2-naphthyl methacrylate, and the like, and may be preferably cyclohexyl methacrylate or phenyl methacrylate, but it is not limited thereto.

In the acrylic copolymer resin, the (meth)acrylate-based monomer containing an aliphatic ring and/or an aromatic ring is present preferably in an amount of more than 0 wt % and 50 wt % or less, more preferably more than 0 wt % and 30 wt % or less, and most preferably 5 wt % to 30 wt %. When the (meth)acrylate-based monomer containing an aliphatic ring and/or an aromatic ring is present in the range, heat resistance may be sufficiently secured.

In the acrylic copolymer, the imide-based monomer means a monomer including an imide group, and may be, for example, maleimides, and the like. Among them, maleimides substituted with a cycloalkyl group or an aryl group may be used in order to increase the heat resistance of the acrylic copolymer.

A cycloalkyl group which may be substituted in the imide-based monomer is preferably a cycloalkyl group with a carbon number of 3 to 15, and more preferably a cyclohexyl group. In addition, an aryl group which may be substituted in the imide-based monomer is an aryl group with a carbon number of 6 to 15, and more preferably a phenyl group.

Specific examples of the imide-based monomer may be N-cyclohexylmaleimide, N-phenylmaleimide, N-chlorophenylmaleimide, N-methylphenylmaleimide, N-naphthylmaleimide, N-hydroxyphenylmaleimide, N-methoxyphenylmaleimide, N-carboxyphenylmaleimide, N-nitrophenylmaleimide, N-tribromophenylmaleimide, and the like. These monomers may be used alone or in combination thereof. Among these monomers, N-cylcohexylmaleimide or N-phenylmaleimide is particularly preferable, but it is not limited thereto.

In the acrylic copolymer resin, the imide-based monomer is present preferably in an amount of 0.1 wt % to 50 wt %, and more preferably 1 wt % to 20 wt %. When the imide-based monomer is present in the range, it is preferable because the degradation of mechanical strength may be minimized while heat resistance is secured.

In the acrylic copolymer, the styrene-based monomer means a monomer containing a styrene group, and may be, for example, styrene, α-methylstyrene, 3-methylstyrene, 4-methylstyrene, 2,4-dimethylstyrene, 2,5-dimethylstyrene, 2-methyl-4-chlorosytrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene, and the like. Among them, α-methylstyrene is most preferable in terms of polymerizability and heat resistance, but it is not limited thereto.

In the acrylic copolymer resin, the styrene-based monomer is present preferably in an amount of 0.1 wt % to 50 wt %, and more preferably 1 wt % to 20 wt %. When the styrene-based monomer is present in the range, it is preferable because the degradation of mechanical strength may be minimized while heat resistance is secured.

In addition, the acrylic copolymer resin preferably has a molecular weight of 50,000 to 500,000 in terms of heat resistance, processability, and productivity.

The acrylic copolymer resin has a glass transition temperature of preferably 120° C. or more, and more preferably 130°

C. or more. Although the glass transition temperature of the acrylic copolymer resin is not particularly limited, it may be 200° C. or less.

According to another aspect of the present invention, there is provided a resin composition containing the acrylic copolymer resin and a resin containing an aromatic ring and/or an aliphatic ring in the main chain thereof.

In the resin composition, the resin containing an aromatic ring and/or an aliphatic ring in the main chain thereof may be, for example, a polycarbonate-based resin, a polyacrylate-based resin, polynaphthalene-based resin, a polynorbornene-based resin, and the like. The resin may be a polycarbonate-based resin, but it is not limited thereto.

In the resin composition, a weight ratio of the acrylic copolymer resin to the resin containing an aromatic ring and/or an aliphatic ring in the main chain thereof is preferably 60 to 99.9:0.1 to 40, and more preferably 70 to 99:1 to 30.

The resin composition may be prepared by blending the acrylic compolymer resin with the resin containing an aromatic ring and/or an aliphatic ring in the main chain thereof according to a method well known in the art, such as a compounding method, and an additive well known in the art, such as a colorant, a flame retardant, an enhancer, a filler, a UV stabilizer, an antioxidant, and the like, may be included in an amount of 0.001 to 70 parts by weight.

The resin composition has a glass transition temperature of preferably 110° C. and more preferably 120° C. The glass transition temperature of the resin composition is not particularly limited, but it may be 200° C. or less.

In addition, the resin composition preferably has a weight average molecular weight of 50,000 to 500,000 in terms of heat resistance, sufficient processability, productivity, and the like.

According to another aspect of the present invention, there is provided 3) an optical film including the resin composition.

An optical film according to the present invention may have different retardation values according to the content of a resin containing an aromatic ring and/or an aliphatic ring in the main chain thereof, and thus may be used as a retardation compensation film or a protective film.

The retardation compensation film may be used on the VA mode type or the TN mode type according to the retardation value. An optical film according to the present invention has an in-plane retardation value ($R_{in}$) of 30 nm to 80 nm and a thickness retardation value ($R_{th}$) of −50 nm to −300 nm, and may be used as a VA mode type retardation compensation film in this case. In addition, an optical film according to the present invention may have an in-plane retardation value ($R_{in}$) of 150 nm to 200 nm and a thickness retardation value ($R_{th}$) of −90 nm or less, that is, an absolute value of 90 or more of the thickness retardation value, and may be used as a TN mode type retardation compensation film in this case. When the TN mode type retardation compensation film is used, the thickness retardation value ($R_{th}$) is more preferably in a range of −90 nm to −150 nm.

As an example, when the resin containing an aromatic ring and/or an aliphatic ring in the main chain thereof is present in an amount of 10 wt % to 40 wt %, the optical film may have an in-plane retardation value ($R_{in}$) of 30 nm to 80 nm and a thickness retardation value ($R_{th}$) of −50 nm to −300 nm. In this case, the optical film according to the present invention may be used as a VA mode type retardation compensation film.

As another example, when the resin containing an aromatic ring and/or an aliphatic ring in the main chain thereof is present preferably in an amount of 0.1 wt % to 10 wt % and more preferably 1 wt % to 5 wt %, the optical film may have an in-plane retardation value ($R_{in}$) of 0 nm to 10 nm, preferably 0 nm to 5 nm, and more preferably about 0 nm, and a thickness retardation value ($R_{th}$) of −10 nm to 10 nm, preferably −5 nm to 5 nm, and more preferably about 0 nm. In this case, the optical film according to the present invention may be used as a polarizer protective film.

Figure 2:
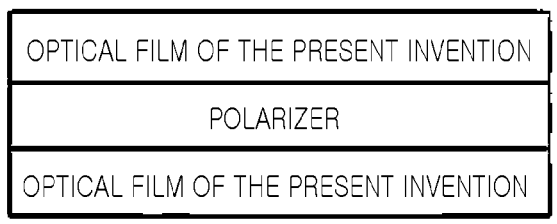
Figure 2:
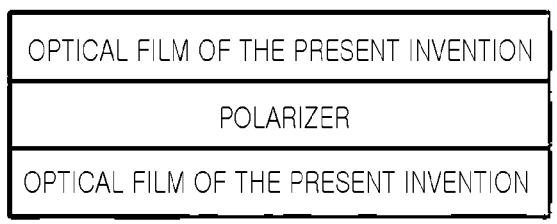

An example in which the optical film according to the present invention is used as a protective film is shown in FIG. 2. Although protective films provided on both sides of two polarizing plates are all optical films according to the present invention, but a related-art protective film may be used in at least one of the protective films.

The 3) optical film may be manufactured into a film by a method well known in the art, such as a solution cast method or an extrusion method, using the 2) resin composition, and the solution cast method may be preferably used among them.

The method may further include stretching the film manufactured as above uniaxially or biaxially, and the film may be manufactured by adding a modifier, if necessary.

The stretching process may be performed by using any one of a machine direction (MD) stretching and a transverse direction (TD) stretching or both of the machine direction stretching and the transverse direction stretching. When both of the machine direction stretching and the transverse direction stretching are performed, any one of them may be first performed and then the other may be performed, or both of them may be performed simultaneously. The stretching may be performed through a single step or through multi-steps. When the stretching is performed in the machine direction, the stretching may be performed by using a difference in speed between rolls, and when the stretching is performed in the transverse direction, the tenter may be used. The rail initiating angle of the tenter is 10° or less, a bowing phenomenon that occurs when the transverse direction stretching is performed is suppressed, and the angle of the optical axis is regularly controlled. By performing the transverse direction stretching through multi-steps, the suppression phenomenon of the bowing phenomenon may be obtained.

The stretching may be performed at a temperature in the range of (Tg−20° C.) to (Tg+30° C.) when the glass transition temperature of the resin composition is Tg. The glass transition temperature means a range from a temperature at which storage elasticity of the resin composition starts to be reduced and the loss elasticity starts to be larger than the storage elasticity to a temperature at which alignment of the polymer chain is loosened and removed. The glass transition temperature may be measured by using a differential scanning calorimeter (DSC). The temperature during the stretching process is more preferably the glass transition temperature of the film.

In the case of a small stretching machine (Universal testing machine, Zwick Z010), it is preferable that the stretching rate is in the range of 1 to 100 mm/min. In the case of a pilot stretching machine, it is preferable that the stretching rate is in the range of 0.1 to 2 mm/min. In addition, it is preferable that the film is stretched by using a stretching ratio in the range of 5 to 300%.

Retardation properties of the optical film according to the present invention may be controlled by stretching the optical film uniaxially or biaxially by the method described above.

The optical film manufactured as above preferably has an in-plane retardation value of 0 nm to 200 nm, represented by the following Mathematical Formula 1 and a thickness retardation value of 10 nm to −300 nm, represented by the following Mathematical Formula 2.

$$R_{in}=(n_x-n_y)\times d \qquad \text{[Mathematical Formula 1]}$$

$$R_{th}=(n_z-n_y)\times d \qquad \text{[Mathematical Formula 2]}$$

In Mathematical Formulas 1 and 2, $n_x$ is a refractive index in a direction in which the index is largest, in the film plane, $n_y$ is a refractive index in a direction perpendicular to the $n_x$ direction, in the film plane, $n_z$ is a refractive index in a thickness direction, and d is a film thickness.

In the optical film according to the present invention, the in-plane retardation value and the thickness retardation value may be controlled according to the content of the resin containing an aromatic ring and/or an aliphatic ring in the main chain thereof. For example, the optical film according to the present invention may have an in-plane retardation value ($R_{in}$) of 20 nm to 80 nm and a thickness retardation value ($R_{th}$) of −50 nm to −300 nm. In this case, the optical film according to the present invention may be used as a VA mode type retardation compensation film. In addition, the optical film according to the present invention may have an in-plane retardation value ($R_{in}$) of 0 nm to 10 nm, preferably 0 nm to 5 nm, more preferably about 0 nm, and a thickness retardation value ($R_{th}$) of −10 nm to 10 nm, preferably −5 nm to 5 nm, and more preferably about 0 nm. In this case, the optical film according to the present invention may be used as a polarizer protective film.

When the optical film according to the present invention is applied to a liquid crystal display device, the film may be provided only on one side (one-piece type) of a liquid crystal panel and each provided on both sides. Although the one-piece type is shown in FIG. 3 and the two-piece type is shown in FIG. 4, the scope of the present invention is not limited thereto.

When the optical film according to the present invention is provided only on one side of a liquid crystal panel, the optical film has an in-plane retardation value ($R_{in}$) of 30 nm to 80 nm, preferably 35 nm to 70 nm, and more preferably about 40 nm to about 60 nm, and a thickness retardation value ($R_{th}$) of −270 nm or less, that is, it is preferable that an absolute value of the thickness retardation value is 270 or more.

When the optical films according to the present invention are provided on each side of a liquid crystal panel, the optical films have an in-plane retardation value ($R_{in}$) of 30 nm to 80 nm, preferably 35 nm to 70 nm, and more preferably about 40 nm to about 60 nm, and a thickness retardation value ($R_{th}$) of −100 nm or less, that is, it is preferable that an absolute value of the thickness retardation value is 100 or more.

The optical film according to the present invention has a photoelastic coefficient lower than those of related-art TAC films. The optical film according to the present invention may have a photoelastic coefficient of 10 or less, preferably 8 or less, more preferably 0.1 to 7, and most preferably 0.5 to 6.

The brittleness of the optical film according to the present invention may be measured by dropping an iron sphere with a diameter of 15.9 mm and a weight of 16.3 g on a test film to measure the height of a hole produced on the film. The optical film according to the present invention has a height of preferably 600 nm and more preferably 700 nm.

The optical film according to the present invention has a haze value of preferably 1% or less, more preferably 0.5% or less, and most preferably 0.1% or less.

According to another aspect of the present invention, there is provided a liquid crystal display device including the optical film.

The liquid crystal display device may be a vertical alignment (VA) mode type or TN mode type liquid crystal display device. Although the VA mode type will be usually described, the optical film according to the present invention may be also applied to a TN mode type liquid crystal display device.

In the VN mode type liquid crystal display device, an optical film may be used to compensate the viewing angle, and has two requirements to be compensated. One of them is a light leakage compensation in two polarizing plates due to the characteristics that the absorption axis of the polarizing plates is not apparently perpendicular to each other when a liquid crystal display device is obliquely observed. The other is a necessary compensation because the degradation of the contrast is shown by the occurrence of a light leakage from a cell during black color display due to an increase in birefringence of a liquid crystal molecule when a VA cell is observed from the oblique direction.

A polarizer to be combined with an optical film consists of a uniaxially stretched polyvinylalcohol film containing a dichroic dye, and is very fragile. Thus, the polarizer has low durability to temperature and moisture and is combined with protective films. If an optical film may be directly adhered to a polarizer instead of a protective film, an optical film integrated with a thin retardation film corresponding to a first layer of a protective film may be obtained.

Cellulose derivatives are excellent in water permeability and thus advantageous in that moisture contained in a polarizer may be volatilized through a film in the manufacturing process of a polarizing plate. However, dimensional changes and changes in optical properties according to moisture absorption under high temperature and high moisture atmosphere are relatively large. When the humidity is changed around room temperature, a change in retardation values is so large that there is a limitation on improvement of a stable viewing angle. Thus, the durability of optical properties of a polarizing plate may be deteriorated.

Furthermore, polycarbonate-based materials have such a high glass transition temperature that it is necessary to perform a stretching process at high temperature and an optical switch by stress occurs due to a high photoelastic coefficient. When a norbornene-based is stretched, stress may be high during the stretching or stress may not be uniform during the stretching. These problems may be solved by employing an acryl-based retardation film which has excellent viewing angle compensation effects and has low change in retardation values even under environmental changes.

A liquid crystal display device including one or two or more optical films according to the present invention will be described in more detail as follows.

In a liquid crystal display device including a liquid crystal cell and first and second polarizing plates each provided on both sides of the liquid crystal cell, an optical film may be provided between the liquid crystal cell and the first polarizing plate and/or the second polarizing plate. That is, an optical film may be provided between the first polarizing plate and the liquid crystal cell, and one or two or more optical films may be provided between the second polarizing plate and the liquid crystal cell, or between the first polarizing plate and the liquid crystal cell and between the second polarizing plate and the liquid crystal cell.

The first and second polarizing plates may include a protective film on one surface or both surfaces. The internal protective film may be a triacetate cellulose (TAC) film, a polynorbornene-based film prepared by ring opening metathesis polymerization (ROMP), a ring opening metathesis polymerization followed by hydrogenation (HROMP) polymer film, which is obtained by hydrogenating a ring opening metathesis polymerized cycloolefine-based polymer, a polyester film, and a polynorbonene-based film prepared by addition polymerization. Besides, a film of a transparent polymer material, and the like may be used, but it is not limited thereto.

In addition, the present invention includes a polarizing film and provides an integrated type polarizing plate including an optical film according to the present invention as a protective film on one surface or both surfaces of the polarizing film.

When an optical film according to the present invention is provided only on one surface of a polarizing film, a protective film known in the art may be provided on the other surface.

A film consisting of polyvinyl alcohol (PVA) including iodine or a dichroic pigment may be used as the polarizing film. The polarizing film may be prepared by dyeing iodine or a dichroic pigment on a PVA film, but a manufacturing method thereof is not particularly limited. In the present specification, the polarizing film means a state that does not include the protective film, and the polarizing plate means a state that includes the polarizing film and the protective film.

In an integrated type polarizing plate of the present invention, the protective film and the polarizing film may be combined by using a method that is known in the art.

For example, the combination of the protective film and the polarizing film may be performed by an adhesion method using a bonding agent. That is, a bonding agent is first coated on the surface of a protective film of the polarizing film or a PVA film as a polarizing film by using a roll coater, a gravure coater, a bar coater, a knife coater, or a capillary coater. Before the bonding agent is completely dried, the protective film and the polarizing film are heat-pressed with a combination roll or pressed at room temperature to be combined. When a hot-melt bonding agent is used, a heat-pressing roll should be used.

An available bonding agent during combination of the protective film and the polarizing plate may be a one-component or a two-component PVA bonding agent, a polyurethane-based bonding agent, an epoxy-based bonding agent, a styrene-butadiene rubber-based (SBR-based) bonding agent, or a hot-melt bonding agent, but it is not limited thereto. When the polyurethane-based bonding agent is used, it may preferably be a bonding agent prepared using an aliphatic isocyanate compound which is not yellowed by light. When a one-component or two-component bonding agent for dry laminate or a bonding agent with a relatively low reactivity of isocyanate with hydroxy group is used, a solution bonding agent diluted with an acetate-based solvent, a ketone-based solvent, an ether-based solvent, or an aromatic solvent may be also used. The viscosity of the bonding agent is preferably 5,000 cps or less. These bonding agents may have excellent storage stability and light transmittance of 90% or more at 400-800 nm.

An adhesive may be also used as long as it may show sufficient adhesion. Preferably, the adhesive is sufficiently cured by heat or ultraviolet radiation after combination to increase the mechanical strength thereof to the level of a bonding agent such that its adhesion is too high to peel it off without destroying one or both sides of film to which the adhesive is attached. Specific examples of an available adhesive include natural rubber, synthetic rubber or elastomer, vinyl chloride/a vinyl acetate copolymer, polyvinylalkylether, polyacrylate, or modified polyolefinic adhesive, which have good optical transparency, and hardened adhesives produced by adding a curing agent thereto.

In addition, the present invention provides a liquid crystal display device including the integrated type polarizing plate. The structure of a liquid crystal display device according to the present invention is shown in FIG. 1, but the scope of the present invention is not limited thereto.

When a liquid crystal display device according to the present invention includes the integrated type polarizing plate described above, one or more optical films according to the present invention may be additionally included between a polarizing plate and a liquid crystal cell.

While the present invention has been shown and described in connection with the exemplary embodiments, it will be apparent to those skilled in the art that modifications and variations can be made without departing from the spirit and scope of the invention as defined by the appended claims.

MODE FOR INVENTION

Hereinafter, preferred Examples will be described to aid in understanding of the present invention. The following Examples only illustrate the present invention but the scope of the present invention is not limited thereto.

Evaluation methods of physical properties in the present invention are as follows.

1. Weight average molecular weight (Mw): measured by dissolving a resin prepared in tetrahydrofuran and using a gel chromatography (GPC).

2. Tg (Glass transition Temperature): measured by using a Differential Scanning calorimeter (DSC) from TA Instrument.

3. Retardation value ($R_{in}/R_{th}$): measured by performing the stretching at glass transition temperature of the film and using AxoScan from Axometrics.

4. Haze value (transparency): measured by using a HAZEMETER HM-150 from Murakami color Research Laboratory.

EXAMPLE

Example 1

A resin was manufactured with 82 wt % of methyl methacrylate, 10 wt % of cyclohexyl methacrylate, 3 wt % of alpha-methyl styrene, and 5 wt % of N-cyclohexyl maleimide. The glass transition temperature and molecular weight of the resin prepared were measured and a resin with a glass transition temperature of 135° C. and a molecular weight of 80,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 48/−130 and 0.1, respectively.

Example 2

A resin was manufactured with 65 wt % of methyl methacrylate, 10 wt % of cyclohexyl methacrylate, 10 wt % of styrene, and 15 wt % of N-cyclohexyl maleimide. The glass transition temperature and molecular weight of the resin prepared were measured and a resin with a glass transition temperature of 130° C. and a molecular weight of 90,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 43/−125 and 0.1, respectively.

Example 3

A resin was manufactured with 65 wt % of methyl methacrylate, 20 wt % of cyclohexyl methacrylate, 5 wt % of alpha-methyl styrene, and 10 wt % of phenyl maleimide. The glass transition temperature and molecular weight of the resin prepared were measured and a resin with a glass transition temperature of 131° C. and a molecular weight of 80,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 40/−115 and 0.1, respectively.

Example 4

A resin was manufactured with 82 wt % of methyl methacrylate, 10 wt % of benzyl methacrylate, 3 wt % of alpha-methyl styrene, and 5 wt % of N-cyclohexyl maleimide. The glass transition temperature and molecular weight of the resin prepared were measured and a resin with a glass transition temperature of 130° C. and a molecular weight of 90,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 48/−140 and 0.1, respectively.

Example 5

A resin was manufactured with 80 wt % of methyl methacrylate, 10 wt % of cyclohexyl methacrylate, and 10 wt % of alpha-methyl styrene. The glass transition temperature and molecular weight of the resin prepared were measured and a resin with a glass transition temperature of 130° C. and a molecular weight of 75,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 55/−95 and 0.1, respectively.

Example 6

A resin was manufactured with 80 wt % of methyl methacrylate, 15 wt % of cyclohexyl methacrylate, and 5 wt % of N-cyclohexyl maleimide. The glass transition temperature and molecular weight of the resin prepared were measured and a resin with a glass transition temperature of 118° C. and a molecular weight of 85,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 43/−90 and 0.1, respectively.

Comparative Example 1

A resin was manufactured with 80 wt % of methyl methacrylate and 20 wt % of cyclohexyl methacrylate. The glass transition temperature and molecular weight of the resin prepared were measured and a resin with a glass transition temperature of 119° C. and a molecular weight of 100,000 was obtained. The resin and polycarbonate were mixed at a weight ratio of 90:10 and compounded to prepare a final resin composition. The resin composition was prepared into a film by a solution casting method, a stretching was performed at the glass transition temperature thereof, and a retardation value of the film was measured. As a result, the in-plane retardation value/thickness retardation value and the Haze value were 35/−100 and 0.1, respectively.

The Examples and Comparative Example are summarized in the following Table 1 and Table 2.

TABLE 1

| | Monomer (wt %) | | | | |
|---|---|---|---|---|---|
| | MMA | CHMA | BzMA | Styrene-based | Imide-based |
| Example 1 | 82 | 10 | — | AMS 3 | CHMI 5 |
| Example 2 | 65 | 10 | — | SM 10 | CHMI 15 |
| Example 3 | 65 | 20 | — | AMS 5 | PMI 10 |
| Example 4 | 82 | — | 10 | AMS 3 | CHMI 5 |
| Example 5 | 80 | 10 | — | AMS 10 | — |
| Example 6 | 80 | 15 | — | — | CHMI 5 |
| Comparative Example 1 | 80 | 20 | — | — | — |

MMA: Methyl methacrylate
CHMA: Cyclohexyl methacrylate
BzMA: Benzyl methacrylate
AMS: Alpha-methyl styrene
SM: Styrene
CHMI: N-cyclohexyl maleimide
PMI: Phenyl maleimide

TABLE 2

| | Haze (%) | Tg (° C.) | Mw | $R_{in}$ (nm) | $R_{th}$ (nm) |
|---|---|---|---|---|---|
| Example 1 | 0.1 | 135 | 80,000 | 48 | −130 |
| Example 2 | 0.1 | 130 | 90,000 | 43 | −125 |
| Example 3 | 0.1 | 131 | 80,000 | 40 | −115 |
| Example 4 | 0.1 | 130 | 90,000 | 48 | −140 |
| Example 5 | 0.1 | 130 | 75,000 | 55 | −95 |
| Example 6 | 0.1 | 118 | 85,000 | 43 | −90 |
| Comparative Example 1 | 0.1 | 119 | 100,000 | 35 | −100 |

Examples 7 to 21

A copolymer resin with a monomer composition as in the following Table 3 was prepared, mixed with polycarbonate, and compounded to prepare a final resin composition. The resin composition was prepared into a film by a solution casting method, a stretching was performed at the glass transition temperature thereof, and a retardation value of the film was measured. Physical properties of the film prepared are shown in the following Table 4.

TABLE 3

| | Monomer (wt %) | | | | Acrylate resin (parts by weight) | PC (parts by weight) | Miscibility |
|---|---|---|---|---|---|---|---|
| | MMA | (meth)acrylate-based monomer including a ring | Styrene-based | Imide-based | | | |
| Example 7 | 80 | CHMA 10 | — | PMI 10 | 90 | 10 | 0 |
| Example 8 | 60 | CHMA 20 | — | CHMI 15 | 88 | 12 | 0 |
| Example 9 | 82 | CHMA 10 | AMS 3 | PMI 5 | 88 | 12 | 0 |
| Example 10 | 60 | CHMA 15 | SM 10 | CHMI 15 | 90 | 10 | 0 |
| Example 11 | 80 | BzMA 10 | — | PMI 10 | 90 | 10 | 0 |
| Example 12 | 82 | BzMA 10 | AMS 3 | CHMI 5 | 88 | 12 | 0 |
| Example 13 | 75 | BzMA 15 | SM 10 | — | 90 | 10 | 0 |
| Example 14 | 85 | PhMA 10 | — | PMI 5 | 80 | 20 | 0 |
| Example 15 | 70 | PhMA 20 | — | CHMI 10 | 75 | 25 | 0 |
| Example 16 | 75 | PhMA 10 | AMS 3 | PMI 5 | 80 | 20 | 0 |
| Example 17 | 65 | PhMA 15 | SM 8 | PMI 12 | 77 | 23 | 0 |
| Example 18 | 80 | CHMA 10 | — | PMI 10 | 98 | 2 | 0 |
| Example 19 | 85 | PhMA 10 | — | CHMI 5 | 98.5 | 1.5 | 0 |
| Example 20 | 82 | CHMA 10 | AMS 3 | PMI 5 | 99 | 1 | 0 |
| Example 21 | 75 | PhMA 10 | SM 5 | CHMI 10 | 99.2 | 0.8 | 0 |
| Comparative Example 1 | 80 | CHMA 20 | — | — | 90 | 10 | 0 |

PhMA: Phenyl methacrylate

TABLE 4

| | Tg | Mw | Rin | Rth | Photoelastic coefficient |
|---|---|---|---|---|---|
| Example 7 | 130 | 80000 | 40 | −111 | 3.8 |
| Example 8 | 132 | 90000 | 50 | −121 | 4.2 |
| Example 9 | 135 | 80000 | 52 | −125 | 4.1 |
| Example 10 | 130 | 85000 | 42 | −105 | 3.9 |
| Example 11 | 128 | 85000 | 41 | −100 | 4 |
| Example 12 | 130 | 80000 | 51 | −186 | 4.3 |
| Example 13 | 128 | 80000 | 50 | −99 | 4 |
| Example 14 | 130 | 95000 | 56 | −275 | 5.5 |
| Example 15 | 131 | 100000 | 65 | −296 | 6 |
| Example 16 | 133 | 80000 | 60 | −263 | 5.2 |
| Example 17 | 130 | 90000 | 59 | −273 | 5.7 |
| Example 18 | 130 | 80000 | 1.3 | −2.1 | 1.1 |
| Example 19 | 129 | 95000 | 0.5 | −1.5 | 0.9 |
| Example 20 | 130 | 85000 | 1.5 | −0.6 | 0.6 |
| Example 21 | 133 | 90000 | 0.3 | −0.7 | 0.5 |
| Comparative Example 1 | 119 | 100000 | 45 | −100 | 4 |

The brittlenesses of the optical films prepared in Examples 12 to 14 may be measured by dropping an iron sphere with a diameter of 15.9 mm and a weight of 16.3 g on the test films to measure the heights of holes produced on the films.

TABLE 5

| | Example 12 | Example 13 | Example 14 |
|---|---|---|---|
| Height of a hole produced on a film | 740 mm | 700 mm | 710 mm |

The invention claimed is:

1. An acrylic copolymer consisting essentially of: an alkyl (meth)acrylate-based monomer in an amount of 30 wt. % to 90 wt. %; a (meth)acrylate-based monomer comprising an aliphatic ring and/or an aromatic ring in an amount of more than 0 wt. % and 50 wt. % or less; an imide-based monomer in an amount of 1 wt. % to 50 wt. %; and a styrene-based monomer in an amount of 0.1 wt. % to 50 wt.,%, wherein a glass transition temperature (Tg) of the acrylic copolymer is 120° C. or more and 200° C. or less.

2. The acrylic copolymer of claim 1, wherein the (meth)acrylate-based monomer comprising an aliphatic ring and/or an aromatic ring is a cycloalkyl (meth)acrylate-based monomer or an aryl (meth)acrylate-based monomer.

3. The acrylic copolymer of claim 2, wherein a cycloalkyl group of the cycloalkyl (meth)acrylate-based monomer has a carbon number of 4 to 12, and an aryl group of the aryl(meth)acrylate-based monomer has a carbon number of 6 to 12.

4. The acrylic copolymer of claim 1, wherein the (meth)acrylate-based monomer comprising an aliphatic ring and/or an aromatic ring is selected from the group consisting of cyclopentyl methacrylate, cyclohexyl methacrylate, benzyl methacrylate, cyclohexyl acrylate, 2-phenoxyethyl acrylate, 3,3,5-trimethylcyclohexyl methacrylate, 4-t-butylcyclohexyl methacrylate, 3-cyclohexylpropyl methacrylate, phenyl methacrylate, 4-t-butylphenyl methacrylate, 4-methoxyphenyl methacrylate, 1-phenylethyl methacrylate, 2-phenylethyl acrylate, 2-phenylethyl methacrylate, 2-phenoxyethyl methacrylate, and 2-naphthyl methacrylate.

5. The acrylic copolymer of claim 1, wherein the imide-based monomer is maleimide unsubstituted or substituted with a cycloalkyl group or an aryl group.

6. The acrylic copolymer of claim 1, wherein the imide-based monomer is selected from the group consisting of N-cyclohexyl maleimide, N-phenyl maleimide, N-chlorophenyl maleimide, N-methylphenyl maleimide, N-naphthyl maleimide, N-hydroxyphenyl maleimide, N-methoxyphenyl maleimide, N-carboxyphenyl maleimide, N-nitrophenyl maleimide, and N-tribromophenyl maleimide.

7. The acrylic copolymer of claim 1, wherein the styrene-based monomer is selected from the group consisting of styrene, α-methylstyrene, 3-methylstyrene, 4-methylstyrene, 2,4-dimethylstyrene, 2,5-dimethylstyrene, 2-methyl-4-chlorosytrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene.

8. A resin composition comprising the acrylic copolymer of claim 1 and a resin comprising an aromatic ring and/or an aliphatic ring in the main chain thereof.

9. The resin composition of claim 8, wherein the resin comprising an aromatic ring and/or an aliphatic ring in the main chain thereof is selected from the group consisting of a polycarbonate-based resin, a polyacrylate-based resin, a polynaphthalene-based, and a polynorbornene-based resin.

10. The resin composition of claim 8, wherein the resin composition has a weight ratio of the acrylic copolymer resin to the resin comprising an aromatic ring and/or an aliphatic ring in the main chain thereof of 60 to 99.9:0.1 to 40.

11. The resin composition of claim 8, wherein a glass transition temperature of the resin composition is 110° C. or more.

12. An optical film comprising the resin composition of claim 8.

13. The optical film of claim 12, wherein the optical film is a retardation compensation film or a protective film.

14. The optical film of claim 13, wherein the retardation compensation film is for a VA mode liquid crystal display device or a TN mode liquid crystal display device.

15. The optical film of claim 13, wherein the optical film has an in-plain retardation value of −5 nm to 200 nm, represented by the following Mathematical Formula 1:

$$R_{in}=(n_x-n_y)\times d \quad \text{[Mathematical Formula 1]}$$

where, $n_x$ is a refractive index in a direction in which the index is largest, in the film plane,
$n_y$ is a refractive index in a direction perpendicular to the $n_x$ direction, in the film plane, and
d is a film thickness.

16. The optical film of claim 12, wherein the optical film has a thickness retardation value of 5 nm to −300 nm, represented by the following Mathematical Formula 2:

$$R_{th}=(n_z-n_y)\times d \quad \text{[Mathematical Formula 2]}$$

where, $n_x$ is a refractive index in a direction in which the index is largest, in the film plane,
$n_y$ is a refractive index in a direction perpendicular to the $n_x$ direction, in the film plane,
$n_z$ is a refractive index in a thickness direction, and
d is a film thickness.

17. The optical film of claim 12, wherein the optical film has an in-plane retardation value of 20 nm to 80 nm, represented by the following Mathematical Formula 1, and a thickness retardation value of −50 nm to −300 nm, represented by the following Mathematical Formula 2:

$$R_{in}=(n_x-n_y)\times d \quad \text{[Mathematical Formula 1]}$$

$$R_{th}=(n_z-n_y)\times d \quad \text{[Mathematical Formula 2]}$$

where, $n_x$ is a refractive index in a direction in which the index is largest, in the film plane,
$n_y$ is a refractive index in a direction perpendicular to the $n_x$ direction, in the film plane,
$n_z$ is a refractive index in a thickness direction, and
d is a film thickness.

18. The optical film of claim 12, wherein the optical film has an in-plane retardation value of 0 nm to 10 nm, represented by the following Mathematical Formula 1, and a thickness retardation value of −10 nm to 10 nm, represented by the following Mathematical Formula 2:

$$R_{in}=(n_x-n_y)\times d \quad \text{[Mathematical Formula 1]}$$

$$R_{th}=(n_z-n_y)\times d \quad \text{[Mathematical Formula 2]}$$

where, $n_x$ is a refractive index in a direction in which the index is largest, in the film plane,
$n_y$ is a refractive index in a direction perpendicular to the $n_x$ direction, in the film plane,
$n_z$ is a refractive index in a thickness direction, and
d is a film thickness.

19. The optical film of claim 12, wherein the optical film has a haze value of 1% or less.

20. The optical film of claim 12, wherein the optical film has a photoelastic coefficient of 10 or less.

21. The optical film of claim 12, wherein a height of a hole produced on the optical film by dropping an iron sphere with a diameter of 15.9 mm and a weight of 16.3 g on a test film is 600 mm or more.

22. A liquid crystal display device comprising the optical film of claim 12.

23. The liquid crystal display device of claim 22, wherein the liquid crystal display device is on VA mode.

* * * * *